United States Patent [19]

Treuner et al.

[11] 3,928,335
[45] Dec. 23, 1975

[54] [[(ALKYLTHIOCARBONYL)OXY]ACETYL]CEPHALOSPORINS

[75] Inventors: Uwe Treuner; Hermann Breuer, both of Regensburg, Germany

[73] Assignee: E. R. Squibb & Sons, Inc., Princeton, N.J.

[22] Filed: July 8, 1974

[21] Appl. No.: 486,543

[52] U.S. Cl. .............................. 260/243 C; 424/246
[51] Int. Cl.² ...................................... C07D 501/24
[58] Field of Search ................................ 260/243 C

[56] References Cited
UNITED STATES PATENTS
3,846,418   11/1974   Treuner et al. ................. 260/243 C Primary Examiner—Nicholas S. Rizzo
Attorney, Agent, or Firm—Lawrence S. Levinson; Merle J. Smith

[57] ABSTRACT

[[(Alkylthiocarbonyl)oxy]acetyl]cephalosporins which have the formula

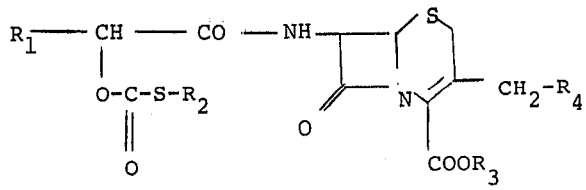

wherein $R_1$ is hydrogen, lower alkyl, phenyl or certain heterocyclic groups; $R_2$ is lower alkyl or phenyl-lower alkyl; $R_3$ is hydrogen, lower alkyl, phenyl-lower alkyl, tri(lower alkyl)silyl, tri(lower alkyl)stannyl, a salt forming ion, or

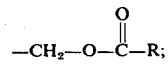

R is lower alkyl, phenyl, or phenyl-lower alkyl; $R_4$ is hydrogen, lower alkanoyloxy, lower alkylthio or a heterothio radical wherein the hetero-cycle is a five membered nitrogen or nitrogen and sulfur containing ring system; are useful as antibacterial agents.

10 Claims, No Drawings

[[(ALKYLTHIOCARBONYL)OXY]ACETYL]CEPHALOSPORINS

SUMMARY OF THE INVENTION

This invention relates to new [[(alkylthiocarbonyl)oxy]acetyl]cephalosporins of the formula (I)

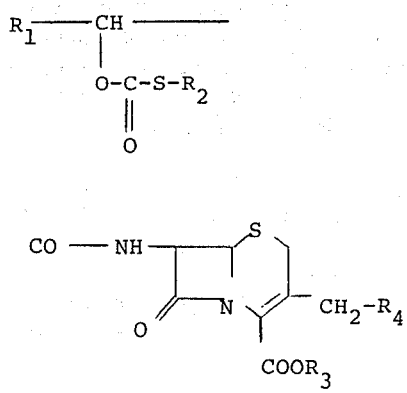

$R_1$ is hydrogen, lower alkyl, phenyl, thienyl, furyl or pyridyl.

$R_2$ is lower alkyl or phenyl-lower alkyl.

$R_3$ is hydrogen, lower alkyl, phenyl-lower alkyl, tri(-lower alkyl)silyl, tri(lower alkyl)stannyl, a salt forming ion, or

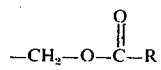

wherein R is lower alkyl, phenyl, or phenyl-lower alkyl.

$R_4$ is hydrogen, lower alkanoyloxy, lower alkylthio or —$SR_5$ wherein $R_5$ is a five-membered nitrogen or nitrogen and sulfur containing heterocyclic group including thiadiazole, triazole, tetrazole and their lower alkyl substituted analogs.

DETAILED DESCRIPTION OF THE INVENTION

The various groups represented by the symbols have the meanings defined below and these definitions are retained throughout this specification.

The lower alkyl groups are straight or branched chain hydrocarbon groups containing one to seven carbon atoms, preferably one to four carbons, especially methyl and ethyl. Examples of the type of these groups are methyl, ethyl, propyl, isopropyl, butyl, t-butyl, pentyl, isopentyl etc. The lower alkylthio groups include such lower alkyl groups attached to a sulfur, e.g., methylthio, ethylthio, propylthio, etc. The phenyl-lower alkyl groups include such lower alkyl groups attached to a phenyl, e.g., benzhydryl, benzyl, phenethyl, etc. especially benzyl and benzhydryl.

The salt forming ions represented by $R_3$ are metal ions, e.g., alkali metal ions such as sodium or potassium, alkaline earth metal ions such as calcium or magnesium, or an amine salt ion, of which a number are known for this purpose, for example, lower alkylamines like methylamine or triethylamine, aralkylamines like dibenzylamine, N-N-dibenzylethylene-diamine, N-ethylpiperidine, etc.

The lower alkanoyloxy groups represented by $R_3$ are the acyl radicals of the lower (two to seven carbon) fatty acids like acetoxy, propionoxy, butyryloxy, etc., especially acetoxy.

The nitrogen heterocyclics in the heterothio group $SR_5$ include thiadiazole (both 1, 2, 4 and 1,3,4-thiadiazole) and their alkyl analogs, e.g., 5-lower alkyl-1,3,4-thiadiazol-1-yl,3-lower alkyl-1,2,4-thiadiazol-5-yl, especially wherein the lower alkyl group is methyl, tetrazole and its lower alkyl analog, e.g., 1-lower alkyl-tetrazol-5-yl, especially wherein the lower alkyl group is methyl, and triazole, e.g., 1,2,4-triazolyl.

Preferred embodiments of this invention are as follows:

$R_1$ is hydrogen, lower alkyl of one to four carbons, phenyl, furyl, thienyl or pyridyl, especially phenyl.

$R_2$ is lower alkyl of one to four carbons, especially methyl or ethyl.

$R_3$ is hydrogen, alkali metal, trimethylsilyl or

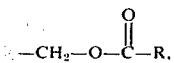

especially hydrogen, pivaloyloxymethyl, sodium or potassium. R is lower alkyl.

$R_4$ is $SR_5$ wherein $R_5$ is thiadiazole, tetrazole and their methyl substituted analogs, especially, 1,3,4-thiadiazole, 5-methyl-1,3,4-thiadiazole, tetrazole and 1-methyltetrazole.

The new derivatives of [[(alkylthiocarbonyl)oxy]acetyl]cephalosporins of this invention are produced by reacting a 7-aminocephalosporanic acid (or derivative wherein $R_3$ is other than hydrogen) of the formula (II)

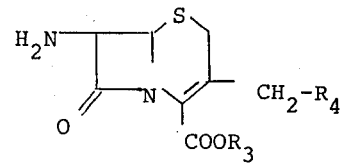

with a thiocarbonyloxyacetic acid of the formula

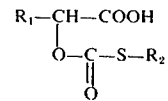 (III)

or an acid halide or anhydride thereof.

The derivatives of II referred to include, for example, the triethylamine derivative, benzhydryl ester or the like. The acid halide of III is preferably the chloride. The reaction can also be carried out in the presence of dicyclohexylcarbodiimide or the like.

The reaction between the 7-aminocephalosporanic acid compound and the [(alkylthiocarbonyl)oxy]acetic acid is effected, for example, by dissolving or suspending the latter or its acid chloride or anhydride in an inert organic solvent such as chloroform, tetrahydrofuran, methylene chloride, dioxane, benzene or the like, and adding, at a reduced temperature of about 0° to −20°C, about an equimolar amount of the 7-ACA or 7-ADCA compound, in the presence of an activating compound such as dicyclohexylcarbodiimide. The product of the reaction is then isolated by conventional procedures, e.g., by filtering off by-products and solvent extracting and/or concentrating or evaporating the solvent.

When $R_4$ is an alkylthio or heterothio radical, 7-aminocephalosporanic or a derivative wherein $R_3$ is other than hydrogen is made to react with a mercaptan HS—$R_5$ (wherein $R_5$ is lower alkyl or one of the heterocycles described above) at a pH of about 8–8.5 to obtain the derivative of formula II wherein $R_4$ is lower alkylthio or heterothio. This intermediate is then acylated as described above. If desired, the reaction with the mercaptan can be effected after acylating the 7-ACA or derivative.

When R is the acyloxymethyl group

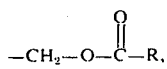

this group may be introduced into the 7-aminocephalosporanic acid moiety prior to the reaction with the [(alkylthiocarbonyl)oxy]acetic acid or derivative by treatment with one to two moles of a halomethyl ester of the formula hal—CH₂OCOR            (IV)

wherein hal is halogen, preferably chlorine or bromine, in an inert organic solvent such as dimethylformamide, acetone, dioxane, benzene or the like, at about ambient temperature or below.

The acids of formula III are formed by reacting an acid of the formula

with a chlorothioformate of the formula

in the presence of a tertiary base such as dimethylaniline and then acidifying.

Alternatively the acid of formula V can be treated with diazodiphenylmethane to produce a compound of the formula

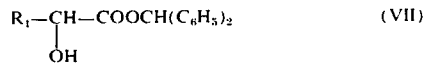

This is then made to react with the acid chloride of the acid of formula III, obtaining an intermediate of the formula

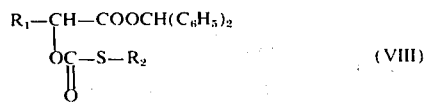

which is treated with trifluoroacetic acid and anisole to obtain the desired acid of formula III.

Further process details are also provided in the illustrative examples.

Certain of the compounds of this invention may exist in different optically active forms. The various stereoisomeric forms as well as racemic mixtures are within the scope of the invention.

The compounds of this invention have antibacterial activity against both gram positive and gram negative organisms such as *Staphylococcus aureus*, *Proteus rettgeri* and *E. hafniae*. They may be used as antibacterial agents in a prophylactic manner, e.g., in cleaning or disinfecting compositions, or otherwise to combat infections due to organisms such as those named above, and in general may be utilized in a manner similar to cephradine and other cephalosporins. For example, a compound of formula I or a physiologically acceptable salt thereof can be used in various animal species in an amount of about 1 to 150 mg./kg. daily, orally or parenterally, in single or two to four divided doses to treat infections of bacterial origin, e.g., 4.0 mg./kg in mice.

Oral forms give prompt high blood levels which are maintained for relatively long periods.

Up to about 600 mg. of a compound of formula I or a physiologically acceptable salt thereof can be incorporated in an oral dosage form such as tablets, capsules or elixirs or in an injectable form in a sterile aqueous vehicle prepared according to conventional pharmaceutical practice.

The following examples are illustrative of the invention. All temperatures are in degrees celsius. Additional variations are produced in the same manner by appropriate substitution in the starting material.

EXAMPLE 1

D-α-[[(methylthio)carbonyl]oxy]phenylacetic acid, diphenylmethyl ester 1.1 g. (10 mM) of chlorocarbonic acid thiomethyl ester dissolved in 5 ml. of chloroform are added dropwise at a temperature of 0° to a solution of 3.18 g. (10 mM) of D-mandelic acid diphenylmethyl ester and 1.01 g. (10 mM) of triethylamine in 20 ml. of chloroform. After 1 hour of stirring, 50 ml. of water are added and after shaking for a short time the phases are separated. After the evaporation of the solvent 3.6 g. of D-α-[[(methylthio)carbonyl]oxy]phenylacetic acid, diphenylmethyl ester in the form of an oily residue are obtained from the organic phase which, after triturating, crystallizes. The product is recrystallized from cyclohexane as white crystals, m.p. 100°–102°.

EXAMPLE 2

D-α-[[(Methylthio)carbonyl]oxy]phenylacetic acid 5 g. of the ester obtained in Example 1 are stirred in a mixture of 50 ml. of trifluoroacetic acid and 5 ml. of anisole at a temperature of 5° for 10 minutes. After drawing off the trifluoroacetic acid in vacuum an oily residue remains which is added to 5N sodium bicarbonate solution. The bicarbonate solution is filtered and extracted with ether. The water phase is cooled and acidified with 2 hydrochloric acid and extracted two times each with 30 ml. of ethyl acetate. After drawing off the solvent, and recrystallizing from cyclohexane/benzene, 1.6 g. of white D-α-[[(methylthio)carbonyl]oxy]phenylacetic acid remains, m.p. 88°–89°.

EXAMPLE 3

D-3-[(Acetyloxy)methyl]-7α-[[[[(methylthio)carbonyl]oxy]phenylacetyl]amino]-8-oxo-5-thia-1-azabicyclo[4.2.0]oct-2-ene-2-carboxylic acid diphenyl methyl ester 1.6 g. of the product of Example 2 are dissolved in 25 ml. of absolute tetrahydrofuran and 1.4 g. (7mM) of dicyclohexylcarbodiimide in 5ml. of tetrahydrofuran are added dropwise with cooling and stirring. After half an hour, 2.95 g. (7mM) of 7-aminocephalosporanic acid benzhydryl ester dissolved in tetrahydrofuran are added. The mixture is stirred overnight and after filtration and evaporation of the filtrate in vacuum, 3.7 g. of D-3-[(acetyloxy)methyl]-7β-[[[[(methylthio)carbonyl]oxy]phenylacetyl]amino]-8-oxo-5-thia-1-azabicyclo[4.2.0]oct-2-ene-2-carboxylic acid diphenyl methyl ester are obtained, m.p. 92°–96°.

EXAMPLE 4

D-3-[(Acetyloxy)methyl]-7β-[[[[(methylthio)carbonyl]oxy]phenylacetyl]amino -8oxo-5-thia-1-azabicyclo[4.2.0]oct-2-ene-2-carboxylic acid 3.5 g, of the product of Example 3 are dissolved in 30 ml. of trifluoroacetic acid and, after the addition of 3 ml. of anisole, stirred for 10 minutes at 0°. After drawing off the trifluoroacetic acid in vacuum, 6.0 g. of an oily residue remains. The residue is treated with sodium bicarbonate solution. The filtered bicarbonate solution is extracted with ether, acidified with 2 N hydrochloric acid (pH 2.5) at 5° and extracted with ethyl acetate. After drawing off the solvent, 3.5 g, of D-3-[(acetyloxy)methyl-7β-[[[[(methylthio)carbonyl]oxy]phenyl]acetyl]amino]-8-oxo-5-thia-1-azabicyclo[4.2.0]oct-2-ene-2-carboxylic acid is obtained from the ethyl acetate extract. After recrystallization from methylene chloride, carbon tetrachloride, 0.7 g. of the product is obtained as a beige powder, m.p. 86° (dec.).

EXAMPLE 5

3-[[(5-Methyl-1,3,4-thiadiazol-2-yl)thio]methyl]-7-amino-8-oxo-5-thia-1-azabicyclo[4.2.0]oct-2-ene-2-carboxylic acid A mixture of 13.6 g. (0.5 M) of 7-aminocephalosporanic acid (7-ACA) in 100 ml. of water and 50 ml. of acetone are brought to pH 8 with sodium hydroxide while stirring. 9.8 g. (0.57 M) of 2-methyl-1,3,4-thiadiazole-5-thiol are added and the mixture is heated at 80° for four hours. After cooling to 5°, this is acidified to pH 3.5 with dilute hydrochloric acid and stirred for 15 minutes. The precipitated solid is filtered under suction and washed with acetone. This 3-[[(5-methyl-1,3,4-thiadiazol-2-yl)thio]methyl]-7-amino-8-oxo-5-thia-1-azabicyclo[4.2.0]oct-2-ene-2-carboxylic acid is purified by dissolving in sodium bicarbonate solution and reprecipitating with 2N hydrochloric acid; yield 12.7 g. m.p. 206°.

EXAMPLE 6

3-[[(3-Methyl-1,2,4-thiadiazol-5-yl)thio]methyl]-7-amino-8-oxo-5-thia-1-azabicyclo[4.2.0]oct-2-ene-2-carboxylic acid By substituting 3-methyl-1,2,4-thiadiazole-5-thiol for the 2-methyl-1,3,4-thiadiazole-5-thiol in the procedure of Example 5, 11.6 g. of 3-[[(3-methyl-1,2,4-thiadiazol-5-yl)thio]methyl]-7-amino-8-oxo-5-thia-1-azabicyclo[4.2.0]oct-2-ene-2-carboxylic acid, m.p. 186° (dec.). are obtained.

EXAMPLE 7

3-[[(Methyl)-1H-tetrazol-5-yl)thio]methyl]-7-amino-8-oxo-5-thia-1-azabicyclo[4.2.0]oct-2-ene-2-carboxylic acid By substituting 0.57 M of 1-methyl-1H-tetrazole-5-thiol for the 2-methyl-1,3,4-thiadiazole -5-thiol in the procedure of Example 5, 3-[[(1-methyl-1H-tetrazol-5-yl)thio]methyl]-7-amino-8-oxo-5-thia -1-azabicyclo[4.2.0 ]oct-2-ene-2-carboxylic acid is obtained.

EXAMPLE 8

3-[[(1-Methyl-1H-tetrazol-5-yl)thio]methyl]-7β-[[[[(methylthio)carbonyl]oxy]phenylacetyl]amino]-8-oxo-5-thia-1-azabicyclo[4.2.0 ]oct-2-ene-2-carboxylic acid, diphenylmethyl ester 1.05 g. (4.6 mM) of the product of Example 2 are dissolved in 20 ml. of tetrahydrofuran and 0.9 g. of dicyclohexylcarbodiimide (4.6 mM) dissolved in a little tetrahydrofuran are added at 0°. After stirring for 15 minutes, 2.3 g. (4.6 mM) of 3-[[(1-methyl-1H -tetrazol-5-yl)thio]methyl]-7-amino-8-oxo-5-thia-1-azabicyclo[4.2.0]oct-2-ene-2-carboxylic acid diphenylmethyl ester are added dropwise and the whole is stirred for 24 hours at 5°–10°. After filtration and evaporation of the filtrate, 3 g. of 3-[[(1-Methyl-1H-tetrazol5-yl)thio]methyl]-7β-[[[[(methylthio)carbonyl]oxy]phenylacetyl]amino]-8-oxo-5-thia-1-azabicyclo[4.2.0]oct-2-ene-2-carboxylic acid, diphenylmethyl ester are obtained as a light yellow powder which is reprecipitated from tetrahydrofuran-petroleum ether, , m.p. 121° (dec.).

EXAMPLE 9

3-[[(1-Methyl-1H-tetrazol-5-yl)thio]methyl]-7β-[[[[(methylthio)carbonyl]oxy]phenylacetyl]amino]-8-oxo-5-thia-1-azabicyclo[4.2.0]oct-2-ene-2-carboxylic acid 2.4 g. of the diphenylmethyl ester obtained in Example 8 are stirred in a mixture of 15 ml. of trifluoroacetic acid and 3 ml. of anisole for 10 minutes at 5°. After drawing off the trifluoroacetic acid in vacuum, a brown oil remains which is treated with 50 ml. of a 5N sodium bicarbonate solution. The bicarbonate solution is filtered and extracted two times each with 20 ml. of ethyl acetate. Under ice-cooling, the water phase is acidified with 2N hydrochloric acid (pH 2.5) and extracted once again with ethyl acetate. After drying and evaporating, 0.9 g. of 3-[[(1-methyl-1H -tetrazol-5-yl)thio]methyl]-7β-[[[[(methylthio)carbonyl]oxy]phenylacetyl-]amino]-8-oxo-5-thia-1-azabicyclo[4.2.0]oct-2-ene-2-carboxylic acid is obtained as a beige powder from the organic phase. Recrystallization from methylene chloride-carbon tetrachloride yields 0.5 g., m.p., 130°–137° (dec.).

EXAMPLE 10

3-[[(1-Methyl-1H-tetrazol-5-yl)thio]methyl]-7β-[[[[(methylthio)carbonyl]oxy]phenylacetyl]amino]-8-oxo-5-thia-1-azabicyclo[4.2.0]oct -2-ene-2-carboxylic acid potassium salt The potassium salt is obtained by freeze drying a molecular equivalent aqueous solution of the acid of Example 6 and potassium bicarbonate. The potassium salt is obtained as a beige powder.

EXAMPLE 11

7β-[[[2-[(Methylthio)carbonyl]oxy]phenylacetyl]amino]-3-[[(5-methyl-1,3,4-thiadiazol-2-yl)thio]methyl]-8-oxo-5-thia-1-azabicyclo[4.2.0]oct-2-ene-2-carboxylic acid By substituting 6.5 gms. (20 mM) of 3-[[(5-methyl-1,3,4-thiadiazol-2-yl)thio]methyl]-7-amino-8-oxo-5-thia-1-azabicyclo[4.2.0]oct-2-ene-2-carboxylic acid diphenyl methyl ester for the starting material and reacting this with 4.5 gms. of D-α-[(methylthiocarbonyl)oxy]phenylacetic acid according to the procedure of Example 8, and then following the procedure of Example 9 7β-[[[2-[(methylthio)carbonyl]oxy]phenylacetyl]amino]-3-[[(5-methyl-1,3,4-thiadiazol-2-yl)thio]methyl]-8 -oxo-5-thia-1-azabicyclo[4.2.0]oct-2-ene-2-carboxylic acid is obtained as a powder.

EXAMPLE 12

DL-3-[(Acetyloxy)methyl]-7β-[[[[(ethylthio)carbonyl]oxy]phenylacetyl]amino]-8-oxo-5-thia-1-azabicyclo[4.2.0]oct-2-ene-carboxylic acid D-3-[(Acetyloxy)methyl]-7β-[[[(Ethylthiocarbonyl)oxy]phenylacetyl]amino]-8-oxo-5-thia-1-azabicyclo[4.2.0]oct-2-ene-carboxylic acid is obtained by substituting an equivalent amount of β-hydroxyphenylpropionic acid diphenylmethyl ester for the D-mandelic acid diphenylmethyl ester in the procedure of Example 1 and further following the procedures of Examples 2, 3 and 4.

EXAMPLE 13

D-7β-[[[[(Methylthio)carbonyl]oxy]phenylacetyl]amino]-3-methyl -8-oxo-5 -thia-1-azabicyclo[4.2.0]oct-2-ene-2-carboxylic acid By substituting an equivalent amount of 7-ADCA benzhydryl ester for the 7-ACA diphenylmethyl ester in the procedure of Example 3 and then following the procedure of Example 4 with the product, D-7β[[[(methylthio)carbonyl]oxy]phenylacetyl]amino]-3-methyl-8-oxo-5-thia-1-azabicyclo[4.2.-0]oct-2-ene-2-carboxylic acid is obtained.

EXAMPLE 14

7-β-[[[[(Methylthio)carbonyl]oxy]phenylacetyl]amino]-3-methylthio-8-oxo-5-thia-1-azabicyclo[4.2.-0]oct-2-ene-2-carboxylic acid By substituting 7-amino-3-methylthio-8-oxo-5-thia-1-azabicyclo[4.2.0]oct-2-ene-2-carboxylic acid diphenylmethyl ester for the 3-[[(1-methyl-1H-tetrazol-5-yl)thio]methyl]-7-amino-8-oxo-5-thia-1-azabicyclo[4.2.0]oct-2-ene-2-carboxylic acid diphenylmethyl ester in the procedure of Example 8 and then following the procedure of Example 9 with the product, 7-β-[[[[(methylthio)carbonyl]oxy]phenylacetyl]amino]-3-methylthio-8-oxo-5-thia-1-azabicyclo[4.2.0]oct-2-ene -2-carboxylic acid diphenylmethyl ester and free acid are obtained.

EXAMPLE 15

D-3-[(Acetyloxymethyl)]-7-β-[[[[(benzylthio)carbonyl]oxy]phenylacetyl]amino]-8-oxo-5-thia-1-azabicyclo[4.2.0]oct-2-ene-2-carboxylic acid By substituting chlorocarbonic acid benzylthio ester as the starting material in Example 1 and following through Examples 2 to 4, D-3-[(acetyloxy)methyl]-7β-[[[[(benzylthio)carbonyl]oxy]phenylacetyl]amino]-8-oxo-5-thia-1-azabicyclo[4.2.0]oct-2-ene-2-carboxylic acid is obtained.

EXAMPLES 16–40

The products below are obtained by the procedure of Example 8 by reacting the acid

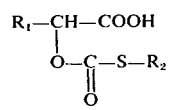

with one of the following:
3-[[(5-methyl-1,3,4-thiadiazolyl-2-yl)thio]methyl]-7-amino-8-oxo-5-thia-1-azabicyclo[4.2.0]oct-2-ene-2-carboxylic acid.
3-[[(1-methyl-1H-tetrazol-5-yl)thio]methyl]-7-ACA
3-[[(1,2,3,4-tetrazol-5-yl)thio]methyl]-7-ACA
3-[[(1-ethyl-1H-tetrazol-5-yl)thio]methyl]-7-ACA
3-[[(1,2,4-thiadiazol-3-yl)thio]methyl]-7-ACA
3-[[(5-butyl-1,2,4-thiadiazol-3-yl)thio]methyl]-7-ACA
3-[[(2-methyl-1,3,4-thiadiazol-5-yl)thio]methyl]-7-ACA
3-[[(1,2,4-thiadiazol-5-yl)thio]methyl]-7-ACA
3-[[(1H-1,2,4-triazol-5-yl)thio]methyl]-7-ACA

Example 16

DL-7β-[[[[2-(methylthio)carbonyl]oxy]-2-(2-pyridyl)acetyl]amino]-3-[[(1H-1,2,4-triazol-5-yl)thio]methyl-8-oxo-5-thia-1-azabicyclo[4.2.0]oct-2-ene-2-carboxylic acid.

Example 17

DL-7β]-[[2-(n-butylthio)carbonyl]oxy]-2-phenylacetyl]amino]-3-[[(1H-1,2,4-triazol-5-yl)thio]-methyl]-8-oxo-5-thia-1-azabicyclo[4.2.0]oct-2-ene-2-carboxylic acid.

EXAMPLE 18

DL-7β-[[2-(methylthio)carbonyl]oxy]acetyl]amino]-3-[[(2-methyl-1,3,4-thiadiazol-5-yl)thio]methyl]-8-oxo-5-thia -1-azabicyclo[4.2.0]oct-2-ene-2-carboxylic acid.

EXAMPLE 19

DL-7β-[(2-ethylthio)carbonyl]oxy]-2-(2-thienyl)acetyl]amino]-3-[[(5-methyl-1,3,4-thiadiazolyl)thio]-methyl]-8-oxo-5-thia-1-azabicyclo[4.2.0]oct-2-ene-2-carboxylic acid, sodium salt.

EXAMPLE 20

DL-7β-[[2-(propylthio)carbonyl]oxy]-2-phenylacetyl]amino]-3-[[(1,2,4-thiadiazol-5-yl)thio]- methyl]-8-oxo-5-thia-1-azabicyclo[4.2.0]oct-2-ene-2-carboxylic acid.

EXAMPLE 21

DL-7β-[[[2-(methylthio)carbonyl]oxy]acetyl]amino]-3-[[(1,2,4-thiadiazol-3-yl)thio]methyl]-8-oxo-5-thia-1-azabicyclo[4.2.0]oct-2-ene-2-carboxylic acid.

EXAMPLE 22

DL-7β-[[2-(ethylthio)carbonyl]oxy]-2-phenylacetyl]amino]-3-[[(5-butyl-1,2,4-thiadiazol-3-yl)thio]-methyl]- 8-oxo-5-thia-1-azabicyclo[4.2.0]oct-2-ene-2-carboxylic acid.

EXAMPLE 23

DL-7β-[2-(methylthio)carbonyl]oxy]butyramido]-3-[[(1,2,3,4-tetrazol-5-yl)thio]methyl]-8-oxo-5-thia-1-azabicyclo[4.2.0]oct-2-ene-2-carboxylic acid.

EXAMPLE 24

DL-7β-[(2-methylthio)carbonyl]oxy]propionamido]-3-[[(1-methyl-1H-tetrazol-5-yl)thio]methyl]-8-oxo-5-thia-1-azabicyclo[4.2.0]oct-2-ene-2-carboxylic acid.

EXAMPLE 25

DL-7β-[[2-methylthio)carbonyl]oxy]-2-phenylacetyl]amino]-3-[[(1-methyl-1H-tetrazol-5-yl)thio]methyl]-8-oxo-5-thia-1-azabicyclo[4.3.0]oct-2-ene -2-carboxylic acid.

EXAMPLE 26

DL-7β-[[2-(butylthio)carbonyl]oxy]-2-phenylacetyl]amino]-3-[[(1-methyl-1H-tetrazol-5-yl)thio]methyl]-8-oxo-5-thia-1-azabicyclo[4.2.0]oct-2-ene -2-carboxylic acid.

EXAMPLE 27

DL-7β-[[2-(methylthio)carbonyl]oxy]-2-(2-pyridyl)acetyl]amino]-3-[[(1-methyl-1H-tetrazol-5-yl)thio]-methyl]-8-oxo-5-thia-1-azabicyclo[4.2.0]oct-2-ene-2-carboxylic acid.

EXAMPLE 28

DL-7β-[[2-(ethylthio)carbonyl]oxy]acetyl]amino]-3-[[(1-ethyl-1H-tetrazol-5-yl)thio]methyl]-1-azabicyclo[4.2.0]oct-2-ene-2-carboxylic acid.

EXAMPLE 29

DL-7β-[[2-(methylthio)carbonyl]oxy]-2-phenylacetyl]amino]-3-[[(1-ethyl-1H-tetrazol-5-yl)thio]methyl]-8-oxo-5-thia-1-azabicyclo[4.2.0]oct-2-ene-2-carboxylic acid.

EXAMPLE 30

DL-7β-[[2-(ethylthio)carbonyl]oxy]-2-phenylacetyl]amino]-3-[[(1,2,4-thiadiazol-3yl)thio]-methyl]-8-oxo-5-thia-1-azabicyclo[4.2.0]oct-2-ene-2-carboxylic acid.

EXAMPLE 31

DL-7β-[[[2-(methylthio)carbonyl]oxy]-2-(2-pyridyl)acetyl]amino]-3-[[(2-methyl-1,3,4-thiadiazol-5-yl]thio]-methyl]-8-oxo-5-thia-1-azabicyclo[4.2.-0]oct-2-ene-2-carboxylic acid.

EXAMPLE 32

DL-7β-[[2-(ethylthio)carbonyl]oxy]-2-(2-furyl)acetyl]amino]-3-[[(5-methyl-1,3,4-thiadiazol-2-yl(thio]methyl]-8-oxo-5-thia-1-azabicyclo[4.2.0]oct-2-ene-2-carboxylic acid and potassium salt.

EXAMPLE 33

DL-7β-[[2-(propylthio)carbonyl]oxy]-2-(2-thienyl)acetyl]amino]-3-[[(1,3,4-oxadiazol-2-yl)thio]methyl]-8-oxo-5-thia-1-azabicyclo[4.2.0]oct-2-ene-2-carboxylic acid and sodium salt.

EXAMPLE 34

DL-7β-[[(2-ethylthio)carbonyl]oxy]acetyl]amino]-3-[[(5-ethyl-1,3,4-oxadiazol-2-yl)thio]methyl]-8-oxo-5-thia-1-azabicyclo[4.2.0]oct-2-ene-2-carboxylic acid.

EXAMPLE 35

DL-7β-[[2-(n-butylthio)carbonyl]oxyacetyl]amino]-3-[[(1,2,3,4,-tetrazol-5-yl)thio]methyl]-8-oxo-5-thia-1-azabicyclo[4.2.0]oct-2-ene-2-carboxylic acid.

EXAMPLE 36

DL-7β-[[2-(methylthio)carbonyl]oxy]-2-(2-thienyl)acetyl]amino]-3-[[(1H-1,2,4-triazol-5-yl)thio]methyl-8-oxo-5-thia-1-azabicyclo[4.2.0]oct-2-ene-2-carboxylic acid triethylamine salt.

EXAMPLE 37

DL-7β-[[[2-(ethylthio)carbonyl]oxy]-2-(3-furyl)acetyl]amino]-3-[[(1,2,4-thiadiazol-3-yl)thio]methyl]-8-oxo-5-thia-1-azabicyclo[4.2.0]oct-2-ene-2-carboxylic acid pivaloyloxymethyl ester.

EXAMPLE 38

DL-7β-[[[2-(methylthio)carbonyl]oxy]-2-(3-pyridyl)acetyl]amino]-3-[[(1-methyl-1H-tetrazol-5-yl)thio]methyl]-8-oxo-5-thia-1-azabicyclo[4.2.0]oct-2-ene-2-carboxylic acid trimethylsilyl ester.

EXAMPLE 39

DL-7β-[[[2-(methylthio)carbonyl]oxy]-2-(2-thienyl)acetyl]amino]-3-[[(1-methyl-1H -tetrazol-5-yl)thio]methyl]-8-oxo-5-thia-1-azabicyclo[4.2.0]oct-2-ene-2-carboxylic acid.

EXAMPLE 40

DL-7β-[[[2-(benzylthio)carbonyl]oxy]-2-phenylacetyl]amino]-3-[[(1-methyl-1H -tetrazol-5-yl)thio]methyl]-8-oxo-5-thia-1-azabicyclo[4.2.0]oct-2-ene-2-carboxylic acid.

What is claimed is:
1. A compound of the formula

$$R_1-CH(O-C(=O)-S-R_2)-CO-NH-\text{[β-lactam-thia ring]}-CH_2-R_4, COOR_3$$

wherein
  $R_1$ is hydrogen, lower alkyl, phenyl, thienyl, furyl or pyridyl;
  $R_2$ is lower alkyl or phenyl-lower alkyl;

$R_3$ is hydrogen, lower alkyl, phenyl-lower alkyl, tri(lower alkyl)silyl, tri(lower alkyl)stannyl, alkali metal, alkaline earth metal, (lower alkyl)amine or

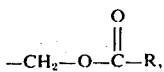

wherein R is lower alkyl, phenyl or phenyl-lower alkyl; and $R_4$ is —$SR_5$ wherein $R_5$ is thiadiazole, triazole, tetrazole and their lower alkyl derivatives.

2. A compound as in claim 1 wherein $R_1$ is hydrogen, lower alkyl of one to four carbons, phenyl, furyl, thienyl or pyridyl; $R_2$ is lower alkyl of 1 to 4 carbons; $R_3$ is hydrogen, alkali metal, trimethylsilyl or

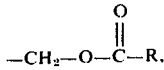

R is lower alkyl and $R_5$ is thiadiazole, tetrazole or their methyl substituted analogs.

3. A compound as in claim 1 wherein $R_1$ is phenyl.

4. A compound as in claim 3 wherein $R_2$ is lower alkyl.

5. A compound as in claim 1 wherein $R_1$ is phenyl, $R_2$ is lower alkyl, $R_3$ is hydrogen and $R_5$ is (lower alkyl)tetrazole.

6. A compound as in claim 5 wherein each lower alkyl group is methyl.

7. A compound as in claim 1 wherein $R_1$ is phenyl, $R_2$ is lower alkyl, $R_3$ is hydrogen and $R_5$ is (lower alkyl)thiadiazole.

8. A compound as in claim 7 wherein $R_2$ is methyl and $R_5$ is 5-methyl-1,3,4-thiadiazole.

9. Alkali metal salt of the compound of claim 6.

10. A salt as in claim 9 wherein the alkali metal is potassium.

* * * * *